United States Patent [19]

Takeuchi et al.

[11] Patent Number: 4,633,834

[45] Date of Patent: Jan. 6, 1987

[54] SPARK TIMING CONTROL DEVICE FOR INTERNAL COMBUSTION ENGINE

[75] Inventors: Toshio Takeuchi, Hamamatsu; Hiroshi Tomita; Takio Ogasawara, both of Shizuoka, all of Japan

[73] Assignee: Sanshin Kogyo Kabushiki Kaisha, Japan

[21] Appl. No.: 711,185

[22] Filed: Mar. 13, 1985

[30] Foreign Application Priority Data

Mar. 16, 1984 [JP] Japan .................................. 59-50544

[51] Int. Cl.[4] .............................................. F02D 5/04
[52] U.S. Cl. .................................... 123/424; 123/418; 123/602
[58] Field of Search ......................... 123/602, 424, 418

[56] References Cited

U.S. PATENT DOCUMENTS

| | | | |
|---|---|---|---|
| 3,779,218 | 12/1973 | Nambu | 123/424 |
| 3,793,833 | 2/1974 | Van Basshuysen | 123/424 |
| 3,813,877 | 6/1974 | Hunt | 123/424 |
| 3,923,023 | 12/1975 | Ito | 123/424 |
| 4,096,843 | 6/1978 | Marsee | 123/424 |
| 4,104,998 | 8/1978 | Fenn | 123/424 |
| 4,133,325 | 1/1979 | West | 123/424 |
| 4,244,336 | 1/1981 | Fitzner | 123/602 |
| 4,404,952 | 9/1983 | Fujimoto | 123/602 |
| 4,446,841 | 5/1984 | Van Siclen | 123/602 |

*Primary Examiner*—Ronald B. Cox
*Attorney, Agent, or Firm*—Harness, Dickey & Pierce

[57] ABSTRACT

An ignition system spark timing controller having circuits for advancing the time at which the ignition system will produce a sparking potential during the starting of the engine, and for maintaining this advanced spark time for a predetermined time period after the engine has started when the temperature of the engine is below a predetermined temperature level during the starting of the engine. The spark timing controller also includes a circuit for advancing the time at which the ignition system will produce a sparking potential when the speed of the engine is below a predetermined speed level after the engine has started.

9 Claims, 4 Drawing Figures

SPARK TIMING CONTROL DEVICE FOR INTERNAL COMBUSTION ENGINE

BACKGROUND OF THE INVENTION

This invention relates generally to ignition systems for internal combustion engines, and in particular to a spark timing control device and control method for such ignition systems which is especially advantageous during the starting of the engine and during low speed conditions.

In order to improve the starting of an engine or improve the running of the engine during idling, a choke valve is generally provided to create a rich fuel mixture by reducing the air intake. While an enriched fuel mixture is helpful during starting and idling conditions, it is not completely effective in providing for smooth engine operation, since the spark timing must also be considered as well. If a relatively long time is provided before a sparking potential is reached in the ignition system, it will be appreciated that a significant portion of the enriched fuel mixture may be exhausted without being burnt in the engine cylinders. As a consequence, the engine may have difficulty in starting or running smoothly during a low speed condition such as idling. Additionally, acceleration from these conditions may not be as stable as could be achieved by the engine.

Generally, in prior ignition systems, spark timing has been a mechanical function of the engine speed, such that the spark time is advanced as the engine speed is increased and retarded as the engine speed is decreased. Thus, during low rotational engine speeds, such as starting and idling, the spark timing will be retarded. In other words, a relatively long time is provided before a sparking potential is reached in the ignition system. Additionally, in these prior ignition systems, an engine speed level is usually provided where the spark timing will reach a predetermined lower limit. Accordingly, even if the engine speed decreased below this level, the spark timing will not increase beyond this predetermined limit. However, this lower spark timing limit is generally too long to completely burn an enriched fuel mixture which will result when the choke is used during starting and idling conditions of the engine.

It is therefore a principal object of the presnet invention to provide a spark timing control device for an internal combustion engine ignition system which improves the starting and low speed running conditions of the engine.

It is another object of the present invention to provide a spark timing control device which is capable of advancing the spark timing during starting and low speed running conditions of the engine.

It is a further object of the present invention to provide a spark timing control device which is responsive to temperature during the starting of the engine.

It is an additional object of the present invention to provide a spark timing control in a breakerless magneto-type ignition system which employs a variable time consant to control the time at which the ignition system will produce a sparking potential.

SUMMARY OF THE INVENTION

In order to achieve the foregoing objects, the present invention provides a spark timing controller which generally comprises means for advancing the time at which the ignition system will produce a sparking potential during the starting of the engine, and means for maintaining this advanced spark time for a predetermined time period after the engine has started when the temperature of the engine is below a predetermined temperatue level during the starting of the engine. The spark timing controller also includes means for advancing the time at which the ignition system will produce a sparking potential when the speed of the engine is below a predetermined speed level after the engine has started.

In accordance with one feature of the present invention, the spark timing controller is capable of advancing the transmission of a trigger signal which determines when the ignition system will produce a sparking potential. The transmission timing of this signal is electronically controlled to advance the spark time from a predetermined spark time limit during the starting of the engine or during low engine speed conditions.

In accordance with another feature of the present invention, a temperature detector is used in the spark time controller to sense whether or not the engine temperature is below a predetermined temperature level. If the engine temperature is below this predetermined level during the time that the engine is being started, then a time circuit in the spark time controller will operate to maintain the advanced spark time for a predetermined time period after the engine has started.

Additional advantages and features of the present invention will become apparent from a reading of the detailed description of the preferred embodiments which make reference to the following set of drawings in which:

DETAILED DESCRIPTION OF THE PREFERRED EMBODIMENTS

Figure 1:
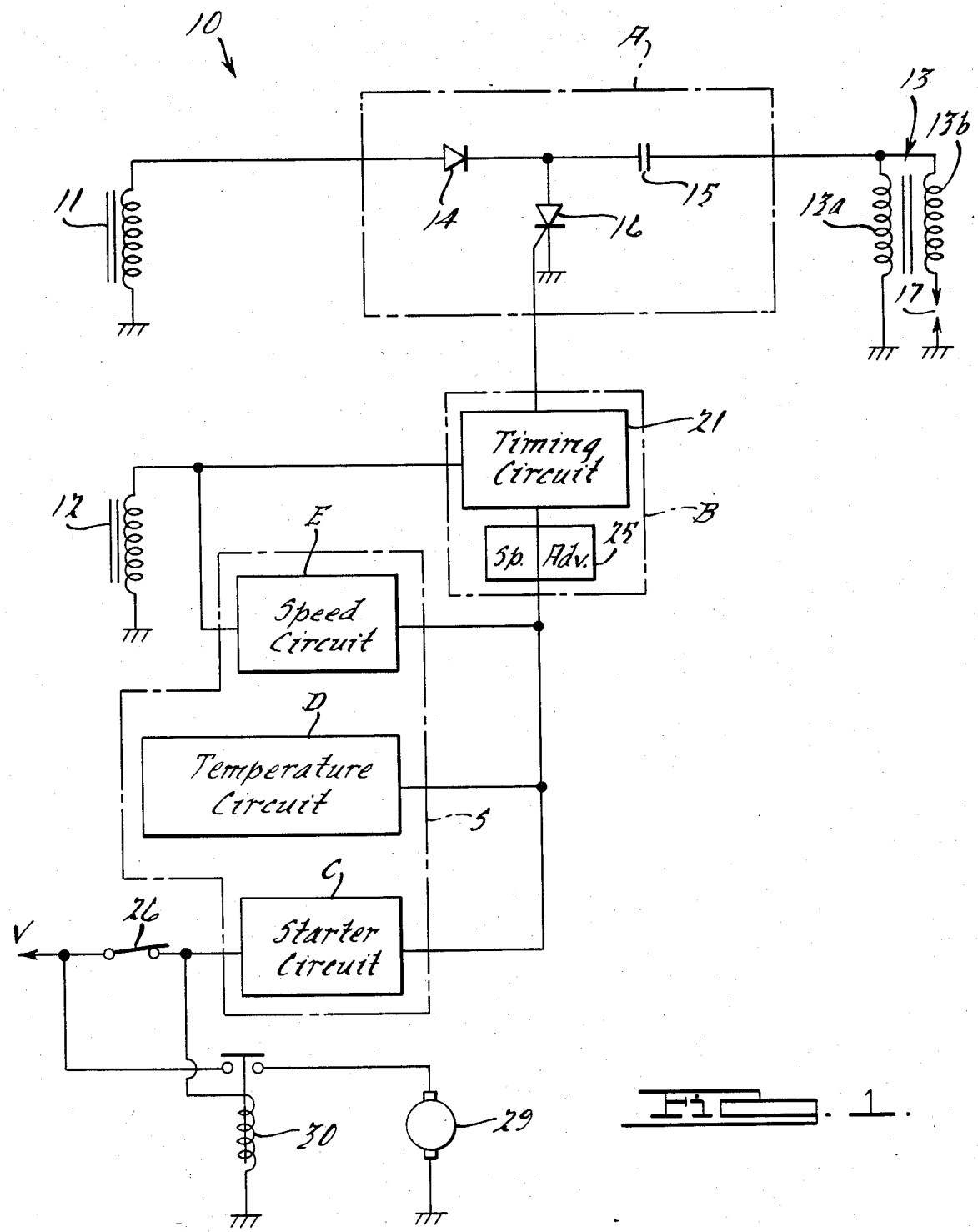
FIG. 1 is a block diagram of an improved ignition system which features a spark timing controller according to the present invention.

Referring to FIG. 1, an ignition system 10 according to the present invention is shown. The ignition system 10 generally includes a generating coil 11, a pulser coil 12, an ignition coil 13, and an ignition control circuit "A". The ignition control circuit comprises a diode 14, a capacitor 15 and a thyristor 16 (also referred to as a silicon controlled rectifier or SCR).

The generating coil 11 and the pulser coil 12 form part of a magneto-type dynamo (not shown) which is adapted to produce time displaced voltage waveforms across these coils as the crankshaft of the engine rotates. In operation, the diode 24 will pass the positive portion of the voltage waveform produced by the generating coil 11. During this time the capacitor 15 will charge through the loop created by the generating coil 11, the diode 14, the capacitor 15 and the primary winding 13a of the ignition coil 13. At the appropriate time, the voltage waveform produced by the pulser coil 12 will become sufficient to trigger the conduction of the thyristor 16. When the thryistor 16 conducts, the capacitor will rapidly discharge through the loop created by the thyristor, the capacitor 15 and the primary winding 13a of the ignition coil 13. This rapid discharge will produce a voltage potential in the secondary winding 13b of the ignition coil 13 which will be sufficient to cause the spark plug 17 to spark and ignite the fuel mixture in the cylinder of the engine.

As will be appreciated by those skilled in the art, the structure and operation of the ignition system discussed thus far is generally conventional. However, it will be seen from the description below that the ignition system 10 also features novel spark timing control circuitry which is capable of modifying the time that the thyristor 16 conducts in response to the starting of the engine and in response to low speed conditions. In this regard, it should be understood that while this spark timing control circuitry is advantageously combined with a capacitor discharge, magneto-type ignition circuit, the principals of the present invention are not limited to this type of ignition circuit. Thus, other suitable types of ignition circuits may be employed in the appropriate application. Additionally, it should be appreciated that the principals of the present invention are susceptible to use in multiple cylinder internal combustion engines as well as single cylinder engines.

The spark timing control circuitry according to the present invention generally includes a trigger signal control circuit "B", a starter circuit "C", a temperature circuit "D", and a speed circuit "E". The starter circuit "C" is used to sense whether or not the engine is in a starting condition. Similarly, the temperature circuit "D" is used to sense whether or not the temperature of the engine (or other suitable temperature) is below a predetermined level during the starting of the engine. Likewise, the speed circuit "E" is used to sense whether or not the rotational speed of the engine is below a predetermined level after the engine has started. Since the circuit C, D, and E are each used to sense a particular engine operating condition, they generally form a condition sensing circuit "S".

When any of the above three conditions are sensed, an appropriate comman or switching signal is transmitted to a spark advance determining circuit 25 in the trigger signal control circuit "B". The spark advance determining circuit 25 in turn causes a timing circuit 21 to advance the time that the ignition system 10 will produce a sparking potential. This is achieved by modifying the transmission time of the voltage waveform or trigger signal produced by the pulser coil 12. Thus, in one embodiment according to the present invention, the timing circuit 21 is adapted to delay the transmission of the trigger signal to the thyristor 16 by a certain amount until the spark advance determining circuit 25 causes the timing circuit to reduce this delay by a time period corresponding to a predetermined spark advance.

FIG. 1 also shows the connection between the ignition system 10 and the engine starting circuit. The engine starter circuit includes an ignition switch 26 which is connected to a suitable electrical power source "V" (such as a battery), a starter motor 29 and a solenoid switch 30. The closing of the ignition switch 26 will be sensed by the starter circuit "C", which will respond by transmitting an appropriate signal to the spark advance determining circuit 25. The closing of the ignition switch 26 will also energize the solenoid switch 30, whereby it will close and permit the flow of electricity necessary for the starter motor to turn the crankshaft of the engine.

Figure 2:
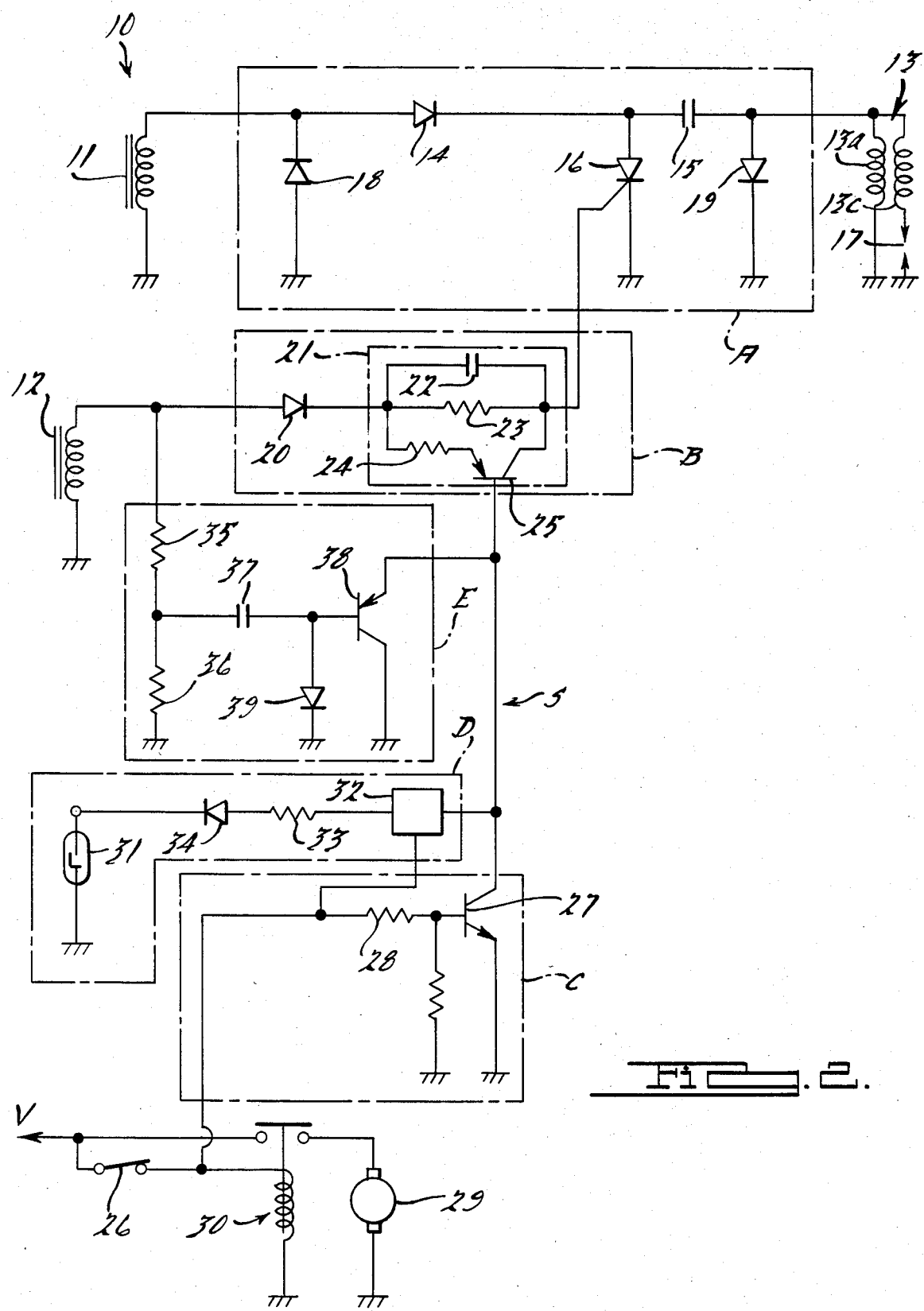
FIG. 2 is a schematic diagram of the improved ignition system illustrated in FIG. 1.

Referring now to FIG. 2, a schematic diagram of the ignition system 10 is shown. It should first be noted that a more detailed schematic diagram of the ignition control circuit A is shown. Specifically, the ignition control circuit is shown to include diodes 18 and 19. Diode 18 is used to provide a current path for the negative portion of the waveform provided by the generating coil 11. Similarly, the diode 19 is used to provide a current path which will permit full wave current flow through the primary winding 13a of the ignition coil 13.

The trigger signal control circuit B is shown to include a rectifying diode 20, a capacitor 22, resistors 23, and 24, and a transistor 25. The diode 20 and the resistor are connected in series between the pulser coil 12 and the gate of the thyristor 16. The capacitor 22 is connected in parallel across the resistor 23. Additionally, the series combination of the resistor 24 and the transistor are connected in parallel across the resistor 23. Specifically, the emitter of the transistor 25 is connected to the resistor 24, while the collector is connected to the junction between the gate of the thyristor 16 and the resistor 23.

It should also be pointed out that the spark advance determining circuit 25 of FIG. 1 is shown to comprise a PNP transistor designated by reference numeral 25. The transistor 25 is used as a switch which places resistor 24 in parallel with resistor 23 when the transistor is "ON" or conducting, and removes resistor 24 from the circuit by creating an open circuit when the transistor is "OFF" or non-conducting. Thus, transistor 25 provides for two distinct time constants in the trigger signal control circuit B. More specifically, when the transistor is OFF, a first or long time constant is provided by the RC couple of resistor 23 with capacitor 22. Similarly, when the transistor 25 is ON, a second or short time constant is provided by the RC couple of capacitor 22 with the parallel combination of resistors 23 and 24.

Accordingly, when the transistor 25 is turned ON, the short time constant will have the effect of decreasing the time it takes to transmit the trigger signal to the gate of the thyristor 16. Hence, the conduction of the transistor 25 will advance the time at which the ignition system 10 will produce a sparking potential across the electrodes of the spark plug 17. The time period by which the spark timing is advanced will be determined by the difference between the long and short time constants discussed above. Thus, it should be appreciated that RC combinations of the timer circuit 21 control the shape of the trigger signal waveform in order to vary the time at which the thyristor 16 is rendered conductive.

FIG. 2 also shows that the starter circuit C includes an NPN transistor 27 and a current limiting resistor 28. The collector of the transistor 27 is connected to the base of the transistor 25, while the base of the transistor 27 is connected to one end of the resistor 28. The other end of the resistor 28 is connected to the engine starting circuit between the ignition switch 26 and the solenoid switch 30. Accordingly, when the ignition switch 26 is closed, the transistor 27 will be biased into a conducting state (i.e., be turned ON), which will in turn bias the transistor 25 into a conducting state. Thus, during the time that the engine is starting, the spark timing will be advanced, as the short time constant will be employed in the trigger signal control circuit B.

The advanced spark time may be maintained for a short time after the engine has started, depending upon the temperature sensed by the temperature circuit D. This temperature circuit includes a temperature detector 31, a timer circuit 32, a resistor 33, and a diode 34. The timer circuit 32 preferably includes an integrated circuit device known as a 555 timer, such as the μPC 1555 timer circuit commercially available from NEC, and a resistor/capacitor combination to provide a preset timing value. However, it should be understood that other suitable timer circuits may be employed in the appropriate application. The temperature detector 31 may be of the type of thermo-switch generally described in U.S. Pat. No. 4,475,502, issued on Oct. 9, 1984 to Kunisyoshi Matsumoto, which is hereby incorporated by reference. This kind of temperature detector is also commercially available from Asahi Keiki as part no. US-118BYHO. However, it should be understood that other suitable temperature detectors may be employed in the appropriate application.

Temperature detector 31 is mounted to the engine, and is electrically open or closed depending upon the temperature of the engine. When the temperature of the engine is below a pre-set temperature level, the temperature detector will be closed, and thus the cathode of the diode 34 will be connected to ground through the temperature detector. However, when the temperature of the engine rises above the pre-set temperature level of the temperature detector, the detector will switch open and break the ground connection to the diode 34.

The diode 34 is connected in series with the resistor 33 which is connected to the timer circuit 32. The timer circuit 32 is also suitably connected to the starter circuit C, such that when it is cold (i.e., the engine temperature is below the predetermined threshold level of the temperature detector 31) and the engine is being started, the timer will produce an output which will maintain the conducting state of the transistor 25 for a predetermined time period after the engine has started and the ignition switch 26 is re-opened. This predetermined time period is set by the resistor/capacitor combination associated with the timer integrated circuit.

Figure 3:
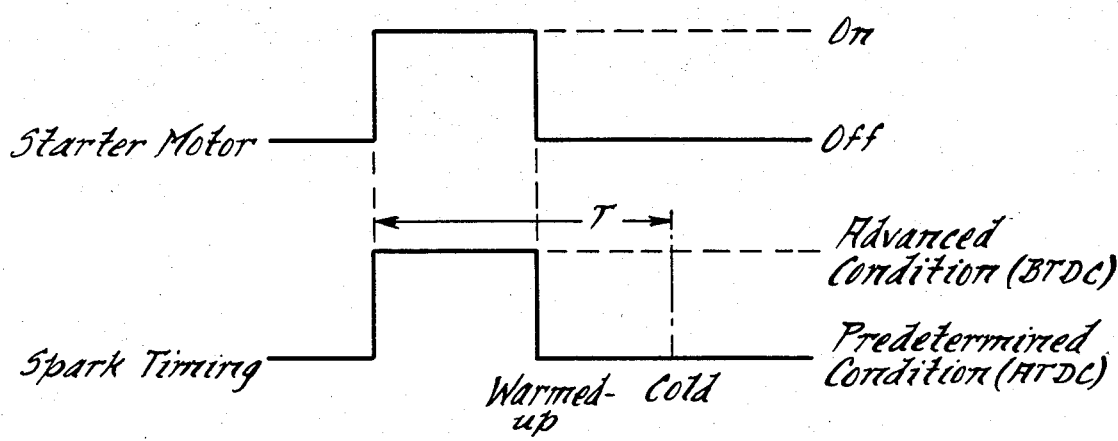
FIG. 3 is a diagram that illustrates one aspect of the spark timing control method according to the present invention which particularly relates to the starting of the engine.

The method of advancing the spark timing in response to the starting of the engine and the temperature of the engine is illustrated in FIG. 3. This figure shows the period of time that the starter motor 29 is turned on during the starting of the engine. Below this diagram for the starter motor is a diagram representing the advancement of the spark timing during the starting of the engine. It will be seen from these two diagrams that the spark timing will be advanced during approximately the same time as the starter motor is operational. The spark timing will be advanced from the sprak time determined in part by the long time constant in the trigger signal control circuit B to the spark time determined in part by the short time constant of this circuit. Prior to advancement, the sparking potential typically will be reached sometime after the piston has reached the top dead center (TDC) in the cylinder during the starting of the engine. Thus, for example, the spark timing at this point may be the predetermined lower limit which would normally provide the longest spark time in the ignition system. However, as shown in FIG. 3, the spark time is preferably advanced such that a sparking potential will be reached at some point before top dead center (BTDC). Nevertheless, it should be appreciated that the amount of spark advance will depend upon the particular engine design used with the ignition system.

FIG. 3 also shows that when the engine temperature is cold, the spark advanced condition will be maintained by the temperature circuit D for a time period "T" which is determined by the timer circuit 32. If, however, the engine is already warmed-up when the engine is being started, the temperature dertector 31 will not trigger the temperature circuit D into operation. Accordingly, the spark advanced condition will terminate when the ignition switch 26 is re-opened and the starter motor 29 is turned off.

Referring again to FIG. 2, the speed circuit E is shown to include voltage dividing resistors 35 and 36, a capacitor 27, a PNP transistor 38 and a diode 39. The resistor 35 is connected at one end to the pulser coil 12. The resistor 36 is connected between the other end of resistor 36 and ground. The capacitor 37 is connected at one end to the junction between resistors 35 and 36, and at the other end to the base of the transistor 38. The collector of the transistor 38 is connected to ground, while the emitter of this transistor is connected to the base of the transistor 25. The anode of the diode 39 is connected to the junction between the capacitor 37 and the base of the transistor 38, while the cathode of the diode is connected to ground.

In operation, the voltage on the capacitor 37 will determine whether or not the transistor 38 will be ON or OFF. When the speed of the engine is below a threshold determined by the relative values of the resistors 35 and 36, the voltage of the capacitor 37 will be relatively low. This is because the capacitor 37 will be discharging faster than it is charging. When the capacitor voltage is low, the transistor 38 will be switched ON, which will in turn place or maintain the transistor 25 into a conducting or ON condition. Thus, it will be appreciated that when the engine speed is below the predetermined threshold of the speed circuit E, the trigger signal control circuit B will advance the spark timing by employing the short time constant. Similarly, when the engine speed exceeds this predetermined threshold level, the spark timing will be retarded back to its normal level. This will occur since the voltage on the capacitor will increase to the point where the transistor 38 will be swtiched OFF.

Figure 4:
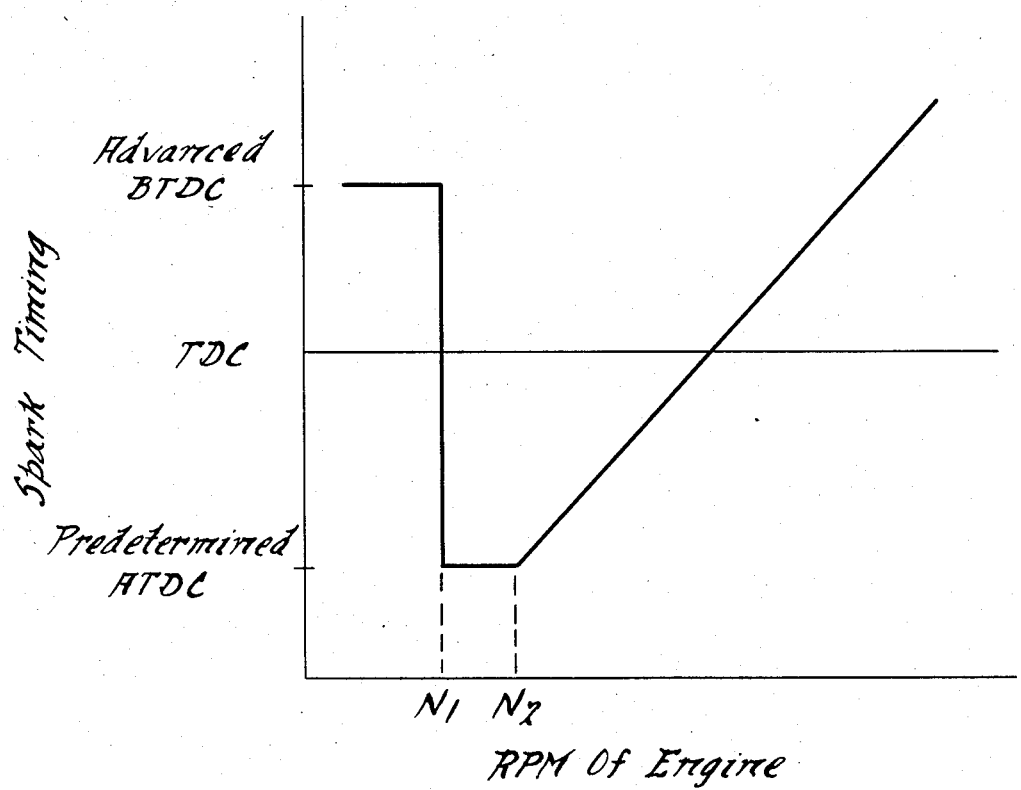
FIG. 4 is a diagram that illustrates another aspect of the sparking timing control method according to the present invention which particularly relates to low speed running conditions of the engine.

This operation is also illustrated with reference to FIG. 4. As will be seen from the diagram of FIG. 4, the spark timing is related to the speed of the engine. When the speed of the engine decreases to speed $N_2$, the spark timing is at its predetermined lower limit and will not be retarded any further. However, if the engine speed continues to decrease down to $N_1$, which represents the threshold level of the speed circuit E, then the spark timing will be advanced from the after top dead center (ATDC) position to the before top dead center (BTDC) position illustrated.

Similarly, when the engine speed increases from its lowest operating speed to speed $N_1$, the spark timing will be maintained at the advanced BTDC position. Then, when the engine speed is increased beyond speed $N_1$, the spark timing will be automatically retarded to the predetermined ATDC position, until the engine speed reaches speed $N_2$. At engine speeds beyond speed $N_2$, the spark timing will gradually increase with increasing engine speeds.

It should be noted that other suitable controlled conduction devices may be used in the place of transistors 25, 27 and 38. Additionally, it should be appreciated that while the trigger signal control circuit B provides for a single short time constant for both low speed and starting conditions, separate time constants (or other separate techniques for advancing the spark timing) could be used for the low speed and starting conditions.

It will be appreciated that the above disclosed embodiment is well calculated to achieve the aforementioned objects of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

We claim:

1. In an ignition system for an internal combustion engine, a spark timing controller, comprising:
    means for advancing the time at which said ignition system will produce a sparking potential during the starting of said engine;
    means for maintaining said advanced spark time for a predetermined time period after said engine has started only if the temperature of said engine is below a predetermined temperature level during the starting of said engine; and
    means for advancing the time at which said ignition system will produce a sparking potential when the speed of said engine is below a predetermined speed level.

2. The invention according to claim 1, wherein said ignition system is a magneto-type capacitive discharge ignition system.

3. In an ignition system for an internal combustion engine having means for generating a trigger signal which determined when said ignition system will produce a sparking potential, a spark timing controller, comprising:
    starter circuit means for determining if said engine is being started;
    temperature circuit means for determining if the temperature of said engine is below a predetermined temperature threshold level during the starting of said engine;
    speed circuit means for determining if the speed of said engine is below a predetermined speed threshold level; and
    control circuit means for controlling the timing of said trigger signal in response to said starting circuit means, said temperature circuit means and said speed circuit means, such that the timing of said trigger signal is advanced by a predetermined amount when the engine is being started for a time period which is dependent upon whether the temperature of said engine is below said predetermined temperature threshold level, and when the speed of said engine is below said predetermined speed threshold level, wherein said temperature circuit means includes timer circuit means for maintaining the advancement of said trigger signal after said engine has started for a predetermined time period when the temperature of said engine is below said predetermined temperature threshold level during the starting of said engine.

4. A method of controlling the spark timing of an ignition system for an internal combustion engine, comprising the steps of:
    advancing the time at which said ignition system will produce a sparking potential during the starting of said engine;
    maintaining said spark advance for a predetermined time period after said engine has started if the temperature of said engine is below a predetermined temperature threshold level during the starting of said engine; and
    advancing the time at which said ignition system will produce said sparking potential when the speed of said engine is below a predetermined speed threshold level after said engine has started.

5. The invention according to claim 3, wherein said temperature circuit means further includes a temperature detector switch which is responsive to said predetermined temperature threshold level.

6. The invention according to claim 3, wherein said control circuit means includes controlled conduction means for switching between a first trigger signal transmission time and a second trigger signal transmission time, said controlled conduction means being connected to at least said starter circuit means and said speed circuit means.

7. The invention according to claim 6, wherein said control circuit means further includes a capacitor and first and second resistors, said capacitor and said first resistor being connected in parallel to determine said first trigger circuit transmission time, and said second resistor being connected to said controlled conduction means such that when said controlled conduction means is rendered conductive, said second resistor will be connected in parallel with said first resistor in order to determine said second trigger signal transmission time.

8. The invention according to claim 3, wherein said speed circuit means includes a capacitor whose charge is responsive to the repetition rate of said trigger signal, and a controlled conduction device which is interposed between said capacitor and control circuit means such that when the charge on said capacitor exceeds the voltage level represented by said predetermined speed threshold level, said controlled conduction device will be rendered conductive.

9. The invention according to claim 3, wherein said starter circuit includes a controlled conduction device which is biased into a conducting condition in response to the closing of an ignition switch.

* * * * *